United States Patent
Kodama

(10) Patent No.: US 7,285,886 B2
(45) Date of Patent: Oct. 23, 2007

(54) MOTOR

(75) Inventor: Mitsuo Kodama, Fujieda (JP)

(73) Assignee: Victor Company of Japan, Limited, Yokohoma (JP)

( * ) Notice: Subject to any disclaimer, the term of this patent is extended or adjusted under 35 U.S.C. 154(b) by 0 days.

(21) Appl. No.: 11/340,460

(22) Filed: Jan. 27, 2006

(65) Prior Publication Data
US 2006/0170300 A1 Aug. 3, 2006

(30) Foreign Application Priority Data
Jan. 28, 2005 (JP) .......................... P2005-020868

(51) Int. Cl.
*H02K 5/16* (2006.01)
(52) U.S. Cl. ........................................ 310/90; 384/107
(58) Field of Classification Search ................... 310/90, 310/90.5; 384/100, 107
See application file for complete search history.

(56) References Cited

U.S. PATENT DOCUMENTS 6,917,130 B2 * 7/2005 Aiello et al. ............... 310/90.5
6,955,469 B2 * 10/2005 Gomyo ........................ 384/107

FOREIGN PATENT DOCUMENTS

| JP | 2001-065552 | 3/2001 |
| JP | 2003-180066 | 6/2003 |

* cited by examiner

*Primary Examiner*—Dang Le
(74) *Attorney, Agent, or Firm*—The Nath Law Group; Jerald L. Meyer; Stanley N. Protigal

(57) ABSTRACT

One preferred embodiment of the present invention provides a motor composed at least of a stator, a rotor, and a dynamic pressure bearing having a thrust dynamic pressure bearing portion and a radial dynamic pressure bearing portion to support the rotor rotatably in relation to the stator, comprising lubrication fluid being filled in a lubrication fluid filled portion connecting said thrust dynamic pressure bearing portion with said radial dynamic pressure bearing portion and being used in common by said thrust dynamic pressure bearing portion and said radial dynamic pressure bearing portion, and a pump-in dynamic pressure generation portion being disposed between said thrust dynamic pressure bearing portion and said radial dynamic pressure bearing portion so as to generate pressure that causes the lubrication fluid to move toward said radial dynamic pressure bearing portion.

5 Claims, 7 Drawing Sheets

MOTOR

BACKGROUND OF THE INVENTION

1. Field of the Invention

The present invention relates to a motor equipped with a dynamic pressure bearing.

2. Description of the Related Art

In a disc reading and writing apparatus, a motor equipped with a dynamic pressure fluid bearing has become in general use as a disc driving motor. This is because a dynamic pressure fluid bearing has a unique characteristic of high reliability and longevity, which is favorable for use in such an apparatus.

By the way, there has been a strong demand for a thin-model disc drive apparatus from the market and thus a thin motor has been required to be equipped therein.

To meet such a demand, there have been disclosed various kinds of thin-model disc drive apparatuses equipped with a thrust dynamic pressure bearing disposed coaxially around a radial dynamic pressure bearing in Japanese Patent Application Laid-open Publications Nos. 2001-65552 (referred to as a patent document 1, hereinafter) and 2003-180066 (referred to as a patent document 2, hereinafter), in contrast to a motor having a thrust dynamic pressure bearing disposed at the end of a shaft.

The patent document 1 discloses a dynamic pressure bearing and a motor using the same. In the motor, a sleeve is provided, at its one end, with a protrusion portion that protrudes radially therefrom. The upper surface and the lower surface of the protrusion portion, and a pair of surfaces provided in a shaft guide member, the pair of surfaces opposing respectively the upper and the lower surfaces, constitute a thrust dynamic pressure bearing, thereby balancing dynamic pressures along a shaft direction.

The patent document 1 discloses in its paragraph 0061 a motor in which a thrust dynamic pressure bearing is formed of the upper surface of a sleeve and the lower surface of a bearing holding member. In this motor, a floating position of a rotor is controlled by balancing a rotor floating pressure generated by the dynamic pressure bearing and a magnetic force generated between a rotor magnet and a stator yoke along the shaft direction.

By the way, the dynamic pressure bearing device or the motor described in the patent document 1 needs to be provided with a pair of dynamic pressure generation portions (thrust dynamic pressure bearing portions) for keeping its rotor floated in an axial direction. Specifically, one of the thrust dynamic pressure bearing portions is formed between the upper surface of a flange portion of the sleeve and its opposing surface; and the other one is formed between the lower surface of the flange portion of the sleeve and its opposing surface.

The thrust dynamic pressure generated by this dynamic pressure generation portions is mainly determined by a gap between a patterned groove formed therein and a surface opposing the groove. Therefore, the bearing device needs to be assembled in such a way that the dynamic pressure groove is precisely formed and the gap is maintained with high precision.

However, it is very difficult to process not only one surface but also the other surface of the flange portion paying much attention to degree of parallelization or the like, because the portion can be significantly deformed by a load applied thereon.

Especially, when the flange portion is thin, the deformation is more significant and, in the end, a height of such a motor can only be reduced to a limited degree.

On the other hand, in the motor having a configuration described in the patent document 2, a magnet has to be magnetized in such a way that a degree of magnetization is not varied, in order to control a floating amount of the rotor along the axis direction. However, it is extremely difficult to control a degree of magnetization at the same time as taking account of magnetic characteristic variations that occur in a sintering process of magnet production.

Moreover, since variations in dimension are particularly larger in a magnet made of a sintered material than in other members and components made of metal, a distance between the magnet and the stator yoke varies and as a result magnetic attractive force cannot be stabilized, which makes it difficult to precisely keep the rotor floated.

In addition, there exists a disadvantage in that an eddy current occurs in the stator yoke, thereby producing a rotational load.

SUMMARY OF THE INVENTION

The present invention has been made in view of the above disadvantages and the objective thereof is a provision of a motor that includes a dynamic pressure bearing whose constituting parts can be easily processed, and has a high reliability, a low-profile construction, and a low rotational load.

In order to achieve the above objective, a first aspect of the present invention provides a motor (M1) composed at least of a stator (S), a rotor (R), and a dynamic pressure bearing having a thrust dynamic pressure bearing portion (SB) and a radial dynamic pressure bearing portion (RB) to support the rotor (R) rotatably in relation to the stator (S), comprising a lubrication fluid filled portion (30P) connecting the thrust dynamic pressure bearing portion (SB) with the radial dynamic pressure bearing portion (RB) and being filled with lubrication fluid (30) to be used in common by the thrust dynamic pressure bearing portion (SB) and the radial dynamic pressure bearing portion (RB), and a pump-in dynamic pressure generation portion (P) being disposed between the thrust dynamic pressure bearing portion (SB) and the radial dynamic pressure bearing portion (RB) so as to generate pressure that causes the lubrication fluid (30) to move toward the radial dynamic pressure bearing portion (RB).

A second aspect of the present invention provides a motor (M1) according to the first aspect, wherein the rotor (R) includes a shaft portion (2s, 10), a cup-shaped hub portion (2), and a thrust ring (12) attached on the inner circumferential surface (2a) of the hub portion (2); wherein the stator (S) includes a flanged sleeve having a sleeve portion (11) with a through hole (11a) into which the shaft portion (2s, 10) is inserted and a flange (11b) extending radially outward at one end of the sleeve portion; wherein the thrust dynamic pressure bearing portion (SB) is comprised of a surface of the flange (11b), a surface which is one of the surfaces of the thrust ring (12) and opposes the surface of the flange (11b), and the lubrication fluid (30) filled therebetween; and wherein the pump-in dynamic pressure generation portion (P) is comprised of a surface of the flange (11b), a surface which is one of the surfaces of the hub portion (2) and opposes the surface of the flange (11b), and the lubrication fluid (30) filled therebetween.

A third aspect of the present invention provides a motor (M1) according to the second aspect, wherein the surface of the flange (11b) is the outer circumferential surface (11b2) of the flange (11b) and wherein the surface of the hub portion (2) opposing the surface of the flange (11b) is the inner circumferential surface (2a) of the hub portion (2).

A fourth aspect of the present invention provides a motor according to the second and the third aspect, wherein the radial dynamic pressure bearing portion (RB) is comprised of an outer circumferential surface of the shaft portion (2s, 10), an inner circumferential surface of the sleeve portion (11), and the lubrication fluid (30) filled therebetween, and wherein the shaft portion (2s, 10) or the sleeve portion (11) has a path (10a; 10b; 11d, 11e) allowing the lubrication fluid (30) to move between both ends of the radial dynamic pressure bearing portion (RB).

According to the present invention, constituting parts and components are easily processed, thereby avoiding an increase in production costs; a rotational load is not increased; and a floating amount of the rotor is stabilized, thereby leading to a higher reliability; and a low-profile construction is realized.

DESCRIPTION OF THE PREFERRED EMBODIMENTS

Referring to FIGS. 1 to 8, a motor M1 according to one of preferred embodiments of the present invention will be described. The motor in this embodiment is a disc-driving motor that has loaded a 1 inch magnetic recording disc and is preferably used in a disc drive apparatus. The motor is capable of rotating 7200 rotations per minute (rpm) during operation.

Figure 1:
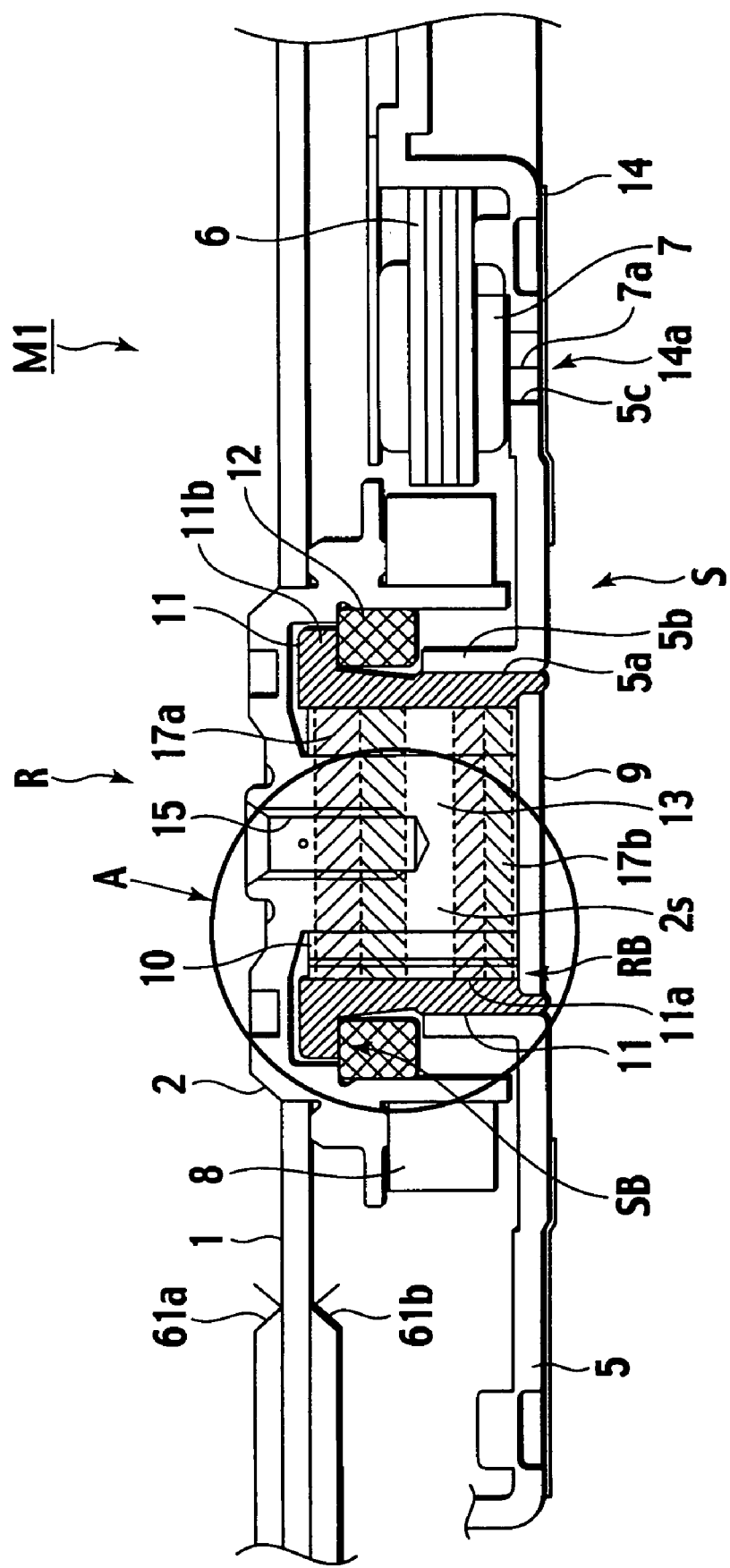
FIG. 1 is a cross-sectional view of a motor according to one embodiment of the present invention.
Figure 2:
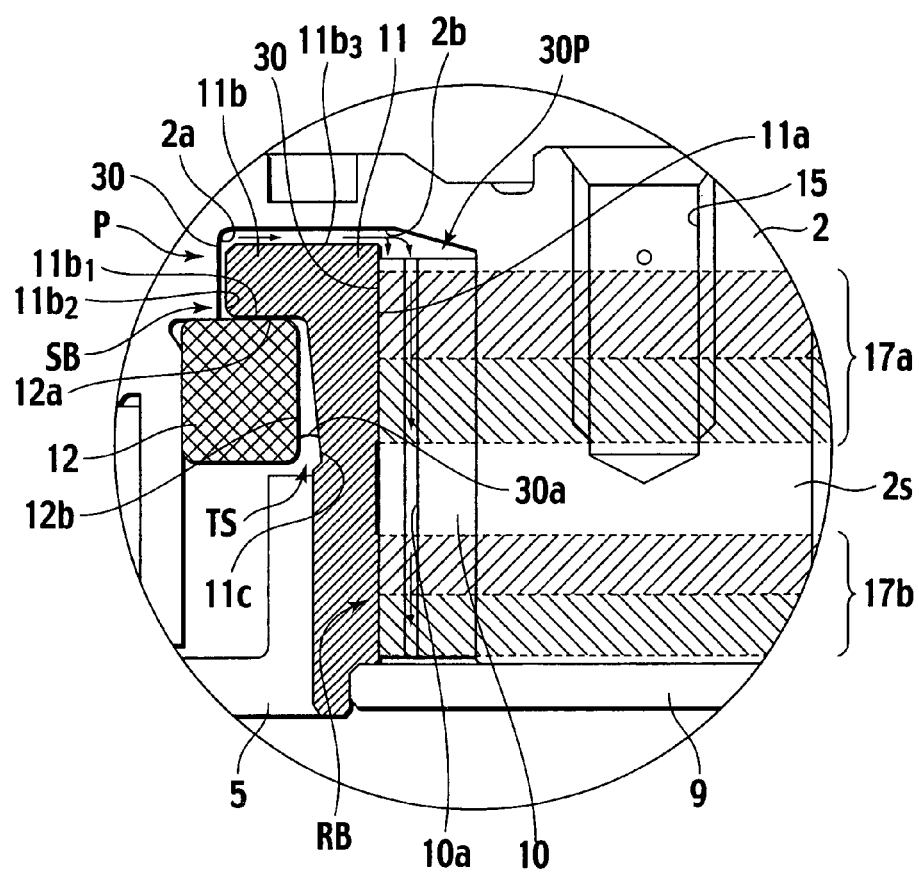
FIG. 2 is an enlarged cross-sectional view of "A" portion in FIG. 1.

As illustrated in FIGS. 1 and 2, the motor M1 is composed of a rotor R having a hub on which a magnetic recording disc 1 is loaded, and a stator S having a sleeve 11. The rotor R is supported rotatably in relation to the stator S by a thrust dynamic pressure bearing portion SB and a radial dynamic pressure bearing portion RB (referred to as a dynamic pressure bearing B hereinafter, as the case may be).

Figure 5:
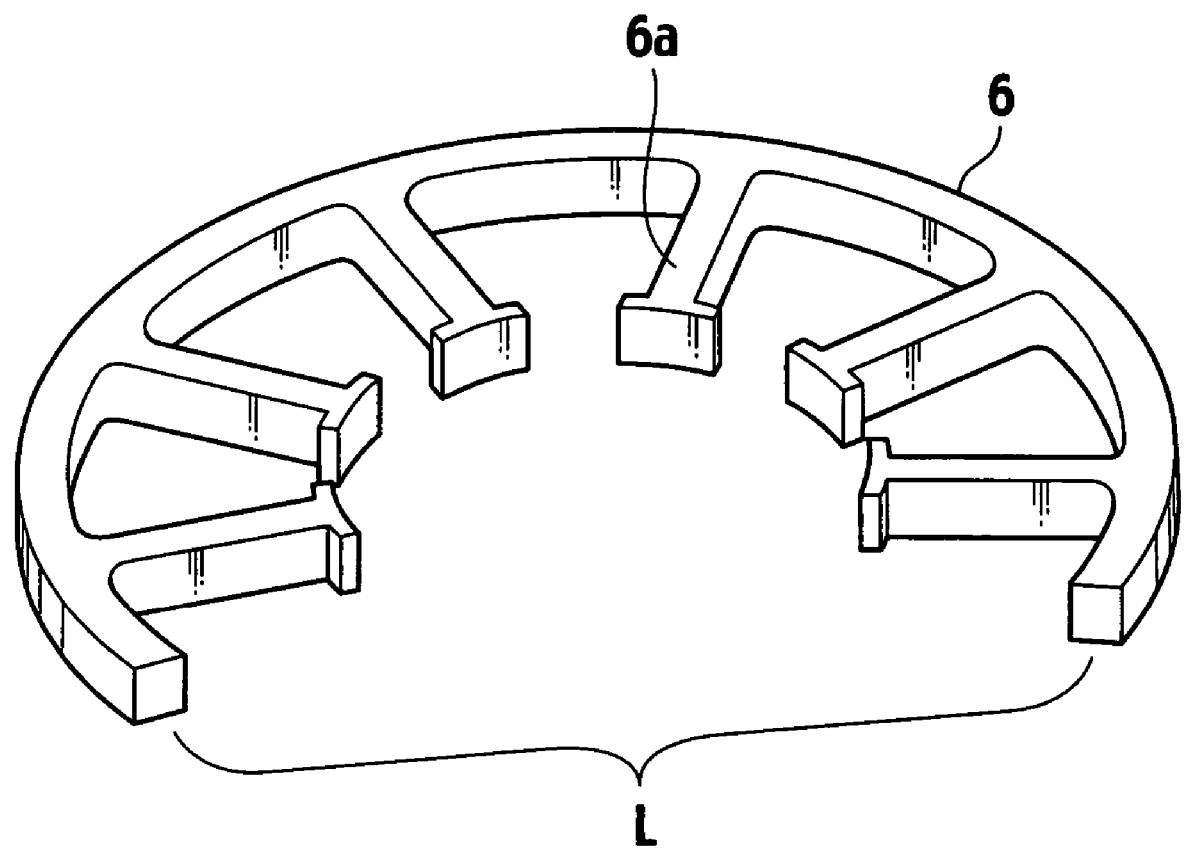
FIG. 5 is a perspective view of a core of the motor illustrated in the precedent drawings.

First, the stator S will be detailed. The stator S has a motor base 5, a cylindrical sleeve 11 secured on the motor base 5, and a core 6. The core 6 is substantially annular shaped having a cut-away portion L that makes the core 6 substantially C-shaped, as illustrated in FIG. 5. The core 6 has a plurality of protruding poles 6a protruding inwardly toward the center of the core 6, each of which has a coil 7 wound therearoud. The core 6 is made by stacking thin silicon steel plates and the surface thereof is insulatively coated by electrophoretic coating, or powder coating.

Referring back to FIG. 1, a lead 7a at one end of the coil 7 goes through a through hole 5c provided in the motor base 5 and is soldered onto a land 14a of a flexible print circuit board (referred to as FPC, hereinafter) 14 attached on the reverse surface of the motor base 25. The land 14a is electrically connected to a motor drive circuit (not shown) of the HDD via a circuit pattern (not shown) formed on the FPC 14. The motor drive circuit provides electric current to each phase of the coil 7, thereby rotating the rotor R.

The motor base 5 is made by aluminum die-casting or by press-processing an aluminum plate or an iron plate. When the motor base 5 is made of an iron plate, the surface thereof is electroplated by Nickel. In addition, the motor base 5 is provided with a cylindrical upright portion 5b having a through hole 5a in the center thereof.

The sleeve 11 is firmly and precisely attached on the motor base by an adhesive in such a way that the outer circumferential surface of the sleeve 11 is fitted with the inner circumferential surface of the upright portion 5b. The sleeve 11 is provided with an insertion hole 11a to which the bearing 10 is inserted (described later) and a flange portion 11b that is formed at one end thereof to protrude outward in a radial direction. In addition, at the other end of the sleeve 11 is sealed with a counter plate 9 thereon. The sleeve 11 is made of a copper alloy such as C3602 or the like, or aluminum.

Next, the rotor R will be detailed. The rotor R is composed of a hub 2 that takes substantially a shape of a cup and has a cylinder solid shaft portion 2s at the center thereof, an annular shaped magnet 8 secured on the outer circumferential surface of the hub 2, and a thrust ring 12 secured on the inner circumferential surface of the hub 2.

The hub 2 is formed of martensite, ferrite, or austenite stainless steel and subjected to a surface treatment such as but not limited to electroless nickel plating for the purpose of increased abrasion resistance and therefore the surface thereof is coated with Nickel of about 3 to 50 micrometers thick.

On the outer surface of the shaft portion 2s is attached a cylindrical bearing 10. The bearing 10 is made of for example copper alloy or stainless steel. When copper alloy is chosen, the surface of the bearing 10 is electro-plated.

In addition, on the upper surface of the hub 2 is provided a male screw 15 for securing a damper (not shown) that secures the magnetic recording disc 1 on the outer periphery of the hub 2 by clamping it between the hub 2 and the clamper.

The male screw 15 is made after the aforementioned surface treatment is carried out on the hub 2, thereby preventing a change in dimension caused by the treatment and a generation of particles caused by peeling-off of the coated material.

The magnet 8 is formed of a sintered material whose surface is treated by electrodeposition coating and has a plurality of magnetic poles. The magnet 8 is adhered on the outer circumferential surface of the hub 2.

The thrust ring 12 is made of a stainless steel and adhered on the inner circumferential surface of the hub 2.

Next, regarding the dynamic pressure bearing portion B, there will be described the radial dynamic pressure bearing portion RB, the thrust dynamic pressure bearing portion SB, and a lubrication oil filled path in this order.

<Radial Dynamic Pressure Bearing Portion RB>

The radial dynamic pressure bearing portion RB is defined by the outer circumferential surface of the bearing 10 secured on the outer circumference of the shaft portion 2s, the inner circumferential surface of the sleeve 11, and lubrication fluid 30 filled in a gap between the two surfaces. The lubrication fluid 30 is referred to as lubrication oil 30 in the following description. However, the lubrication fluid 30 is not necessarily limited to the lubrication oil as far as it is in liquid state.

On the outer circumferential surface of the bearing 10 is formed a pair of radial dynamic pressure grooves 17 (17a, 17b) for generating radial direction dynamic pressure, both of which are separated apart in an axis direction. The radial dynamic pressure grooves 17 are a so-called herringbone groove.

Although the radial dynamic pressure groove 17 is formed on the outer circumferential surface of the bearing 10 in this embodiment, it can be formed on the inner circumferential surface of the sleeve 11.

By the way, FIGS. 1 and 2 illustrate the herringbone groove formed on the outer circumferential surface of the bearing 10 two-dimensionally for the sake of explanation.

Between the bearing 10 and the sleeve 11 is provided a narrow gap, in which lubrication oil 30 is filled. When the rotor R rotates, dynamic pressure is generated in a radial direction by an effect of the radial dynamic pressure groove 17, thereby rotatably supporting the bearing 10 (that is, the rotor R) without contact to the sleeve 11, in other words, leaving a predetermined spacing therebetween.

<Thrust Dynamic Pressure Bearing SB>

The thrust dynamic pressure bearing SB is composed of a lower surface 11b1 of the flange portion 11b of the sleeve 11, an upper surface 12a of the thrust ring 12 opposing to the lower surface 11b1, and the lubrication oil 30 existing between the two surfaces 11b1, 12a.

Figure 3:
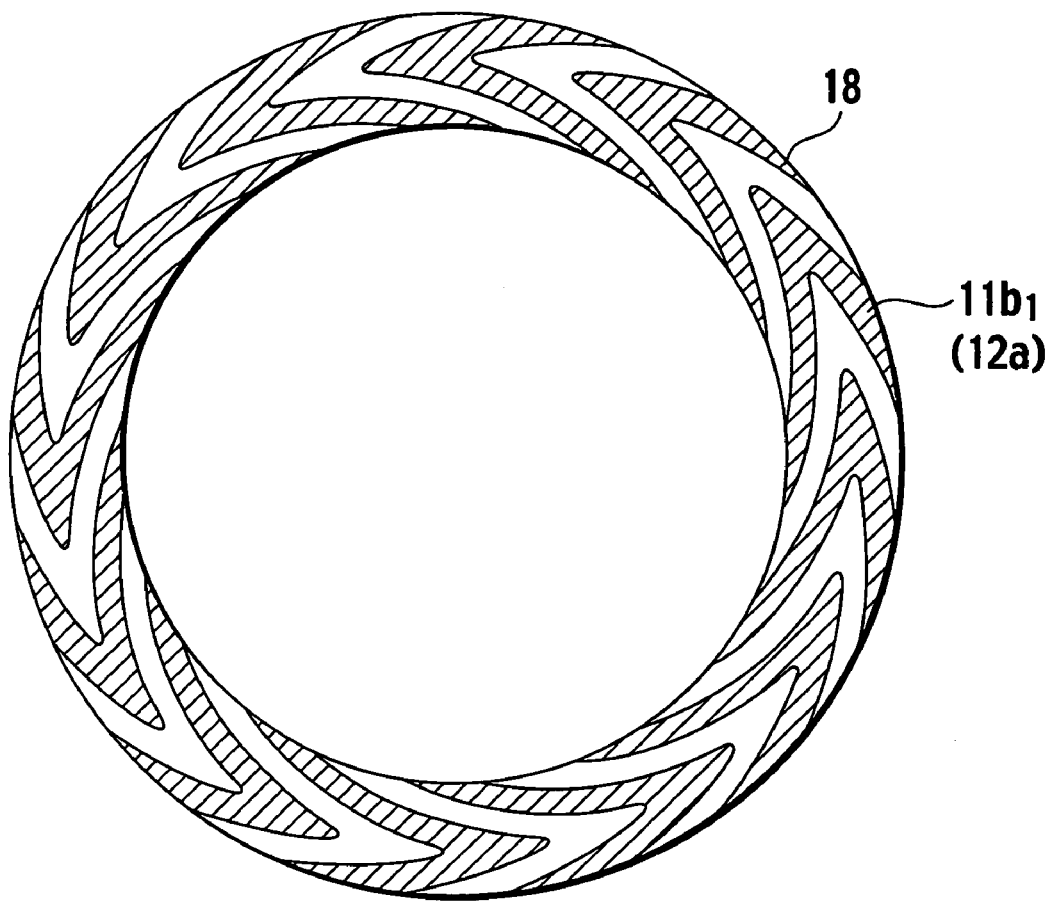
FIG. 3 is a plane view of a first substantial part of the motor according to the one embodiment of the present invention.

In and on the surfaces of the lower 11b1 of the flange portion 11b or the upper surface 12a of the thrust ring 12, there is formed a herringbone groove as a thrust dynamic pressure groove 18, as illustrated in FIG. 3.

The thrust dynamic pressure groove 18 is preferably formed by etching, stamping, or the like.

When the rotor R rotates, dynamic pressure is generated in a thrust direction by an effect of the thrust dynamic pressure groove 18. This pressure then forces the thrust ring 12 to move away from the flange portion 11b, or the rotor R to come close to the motor base 5.

<Lubrication Oil Filled Path>

The aforementioned radial bearing portion RB and the thrust bearing portion SB share the lubrication oil 30 filled in a lubrication oil filled portion (lubrication oil filled path) 30P.

Namely, the lubrication oil 30 is filled in the lubrication oil filled path 30P in the following way. First, the lubrication oil 30 has its own lower oil level (oil surface) 30a positioned in a taper seal portion TS defined by the inner surface 12b of the thrust ring 12 and a seal portion outer circumferential surface 11c of the sleeve 11, the surface 11c opposing the inner circumferential surface 12b. Next, the lubrication oil 30 extends therefrom through the thrust bearing portion SB; a gap between the outer circumferential surface 11b2 of the flange portion 11b plus the upper surface 11b3 of the flange portion 11b and the inner lower surface 2b of the hub 2, the inner lower surface 2b opposing the surfaces 11b2, 11b3; and the radial bearing RB. Then, the lubrication oil 30 reaches a gap between the counter plate 9 and the bearing 10 and finally a gap between the counter plate 9 and the lower surface of the shaft portion 2s.

By the way, the bearing 10 is provided with a through hole 10a penetrating from one end through the other end thereof. Therefore, the lubrication oil 30 can extend from one end to the other of the bearing 10 through not only the radial dynamic pressure bearing RB but also the through hole 10a. The through hole 10a serves to balance the pressure applied on the rotor R in the thrust direction, as described later. The through hole 10a is referred to as a balance hole 10a, the case may be, hereinafter.

Next, the taper seal portion TS defined by the inner circumferential surface 12b of the thrust ring 12 and the outer circumferential surface 11c of the sleeve 11 will be described in detail. The outer circumferential surface 11c is inclined in relation to the inner circumferential surface 12b in such a way that the distance therebetween increases away from the thrust bearing portion SB. Not to mention the surface tension of the lubrication oil 30, such inclination makes it possible to generate a centrifugal force that causes the lubrication oil 30 to move outward (or toward a narrower distance portion) along the inclined surface 11c when the rotor R is rotating, thereby preventing the lubrication oil 30 to leak outside.

The motor according to this embodiment is comprised of a pump-in dynamic pressure generation portion, in addition to the radial dynamic pressure bearing portion RB and the thrust dynamic pressure bearing portion SB. The pump-in dynamic pressure generation portion will be detailed hereinafter.

The pump-in dynamic pressure generation portion P functions to generate dynamic pressure to be applied on the rotor R in the opposite direction to the direction of the dynamic pressure generated by the thrust dynamic pressure portion SR.

The pump-in dynamic pressure generation portion P is composed of the outer circumferential surface 11b2 of the flange portion 11b, the inner circumferential surface 2a of the hub 2 opposing the outer circumferential surface 11b2, and the lubrication oil 30 existing between a gap between the two surfaces 11b2, 2a. Namely, when describing in terms of the lubrication oil path, the pump-in dynamic pressure generation portion P is provided between the thrust bearing portion SB and the radial bearing portion RB.

Figure 4:
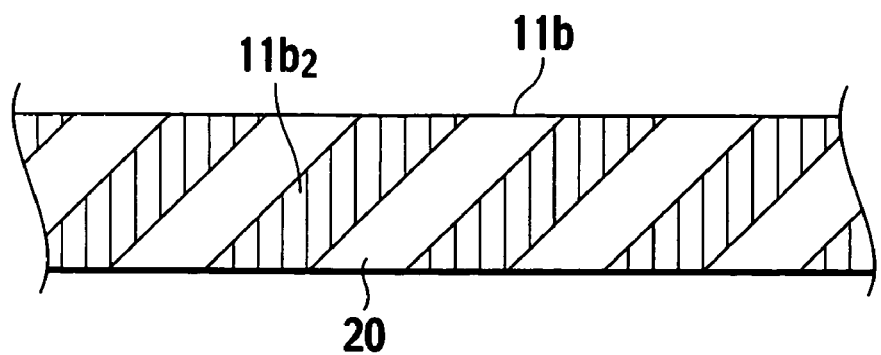
FIG. 4 is a plane view of a second substantial part of the motor according to the one embodiment of the present invention.

The outer circumferential surface 11b2 of the flange portion 11b has a pump-in groove 20 as illustrated in FIG. 4. The pump-in groove 20 is formed so as to generate dynamic pressure to move the lubrication liquid 30 inwardly, or toward the radial bearing portion RB, in the lubrication oil path when the rotor R is rotating.

Therefore, when the rotor R rotates, the dynamic pressure generated by the pump-in dynamic pressure portion P is delivered to the lubrication oil 30 existing in the gap between the counter plate 9 and the bearing 10 (the shaft portion 2s) by way of both the radial bearing portion RB and the balance hole 10a, thereby biasing the rotor R in a direction away from the counter plate 9.

Consequently, the floating amount of the rotor R at the time of rotating can be kept constant, or the floating position of the rotor R can be controlled, by balancing the dynamic pressure generated by the thrust dynamic pressure bearing SB and the dynamic pressure generated by the pump-in dynamic pressure generation portion P.

According to the above configuration, the dynamic pressure generated by the pump-in dynamic pressure generation portion P can be exerted on a very large area, specifically the inner lower surface 2b of the hub 2 opposing the upper surface 11b3 of the sleeve 11, the lower surface of the bearing 10 and the lower surface of the shaft portion 2s, the lower surfaces opposing the counter plate 9, thereby reducing a shaft loss.

When compared with a conventional configuration in which the floating of the rotor is controlled by two thrust dynamic pressure bearings generating dynamic pressures in the opposing directions, the above configuration can reduce shaft loss to a much greater extent.

In addition, since the dynamic pressure for floating the rotor is exerted on a very limited area in case of the thrust dynamic pressure bearing portion in the conventional configuration, the pressure is locally concentrated, thereby causing a rather large amount of shaft loss.

In contrast to this, since the dynamic pressure for floating the rotor R is exerted on a very large area as described above in this embodiment, the pressure is not locally concentrated but dispersed, thereby generating no large shaft loss.

Moreover, a distance between opposing two surfaces on which the dynamic pressure for floating the rotor is applied places almost no influence on the floating pressure even if the distance is not strictly managed. Therefore, the hub, bearing, and the sleeve can be readily manufactured and thus production costs can be reduced.

Furthermore, the balance hole 10a provided in the bearing 10 is capable of reducing a negative influence on the floating amount of the rotor R, the influence being caused by a cylindricality of the radial dynamic pressure bearing RB. The reason will be described below with reference to FIGS. 6A and 6B.

Figure 6A:
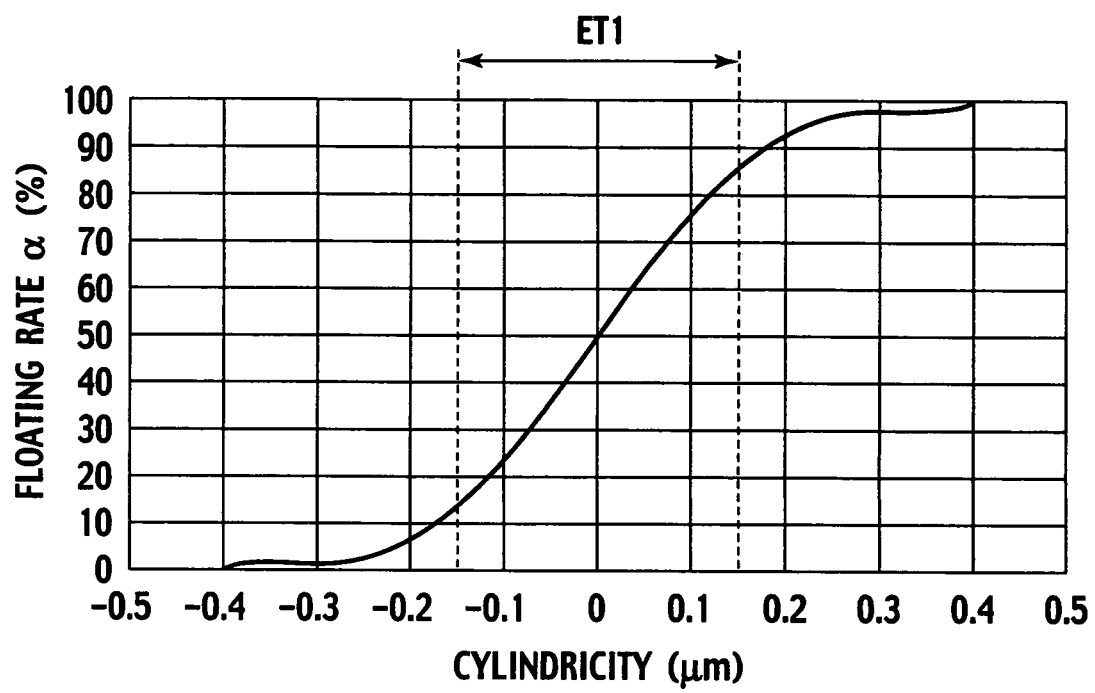
FIGS. 6A and 6B are a graph illustrating an effect exhibited by the motor according to the one embodiment of the present invention.

In the figures, a relation between the cylindricality of the radial dynamic pressure bearing portion RB and the floating rate of the rotor R is shown, wherein the horizontal axis represents the cylindricality and the vertical axis represents the floating rate. FIG. 6A shows the relation when the bearing 10 is not provided with the balance hole 10a and FIG. 6B shows the relation when the bearing 10 is provided with the balance hole 10a.

Specifically, the horizontal axis represents a diameter difference between both ends of the insertion hole 11a of the sleeve 11 in a unit of micrometer. When a diameter of the insertion hole 11a at the end adjacent to the counter plate 9 is larger (smaller) than that at the other end, the diameter difference takes a positive (negative) number.

Figure 6B:
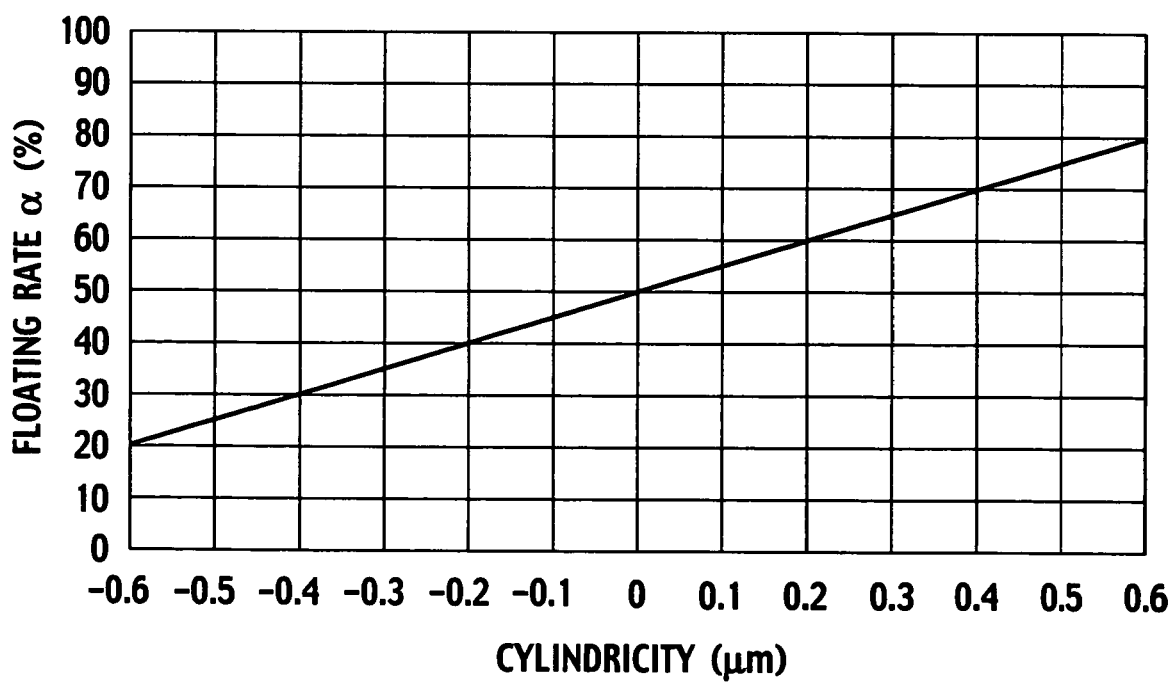

By the way, a bearing whose cylindricality of the outer circumference does not matter is used as the bearing 10 in the motor used in collecting data plotted in FIGS. 6A and 6B.

On the other hand, the vertical axis represents a floating rate in percentage wherein the floating rate is defined as 0% when the rotor R is not floated so that the shaft portion 2s sits on the counter plate 9 whereas it is defined as 100% when the rotor R is floated so that the upper surface 12a of the thrust ring 12 comes in contact with the lower surface 11b1 of the flange portion 11b.

Under such an arrangement, when the cylindricality has a negative number, a gap between the outer circumferential surface of the bearing 10 and the inner circumferential surface of the sleeve 11 becomes smaller in the portion adjacent to the counter plate 9 than in the opposite portion. Therefore, a lubrication oil pressure is higher near the counter plate 9, which then causes the lubrication oil 30 to move in a direction away from the counter plate 9. As a result, a pressure of the lubrication oil 30 existing between the counter plate 9 and the bearing 10 (and/or the shaft portion 2s) reduces, thereby reducing the floating amount of the rotor R.

On the other hand, when the cylindricality has a positive number, the gap becomes larger in the portion adjacent to the counter plate 9 than in the opposite portion. Therefore, a lubrication oil pressure is lower near the counter plate 9, which then causes the lubrication oil 30 to move toward the counter plate 9. As a result, a pressure of the lubrication oil 30 existing between the counter plate 9 and the bearing 10 (and/or the shaft portion 2s) increases, thereby increasing the floating amount of the rotor R.

When the floating rate α is not in a range of 10% or more and 90% or less, the gap between the bearing 10 and the sleeve 11 becomes so large that the shaft loss increases to an unacceptable extent and the rotor S has a higher probability of contacting the stator S, thereby leading to a lower reliability as a motor.

When the bearing 10 is not provided with the balance hole 10a, it can be figured out from FIG. 6A that a cylindricality range ET1 of within +/−0.15 micrometers only satisfies the floating rate of 10% or more and 90% or less. However, a high-volume production with such a high precision (cylindricality of within +/−0.15 micrometers) is significantly difficult.

When the bearing 10 is provided with the balance hole 10a, the cylindricality range of within +/−0.60 micrometers can readily satisfy the floating rate of 10% or more and 90% or less, as shown in FIG. 6B.

Since the cylindricality that allows for no increased production costs nor deteriorated reproducibility can be estimated roughly as within +/−0.40 micrometers, it is presumed from FIG. 6B that the floating rate a of 30% or more and 70% or less is stably and sufficiently realized without an increase in production costs.

Consequently, a provision of the balance hole 10a is highly favorable since a high-volume production is facilitated retaining a high reliability while preventing an increase in production costs.

Figure 7:
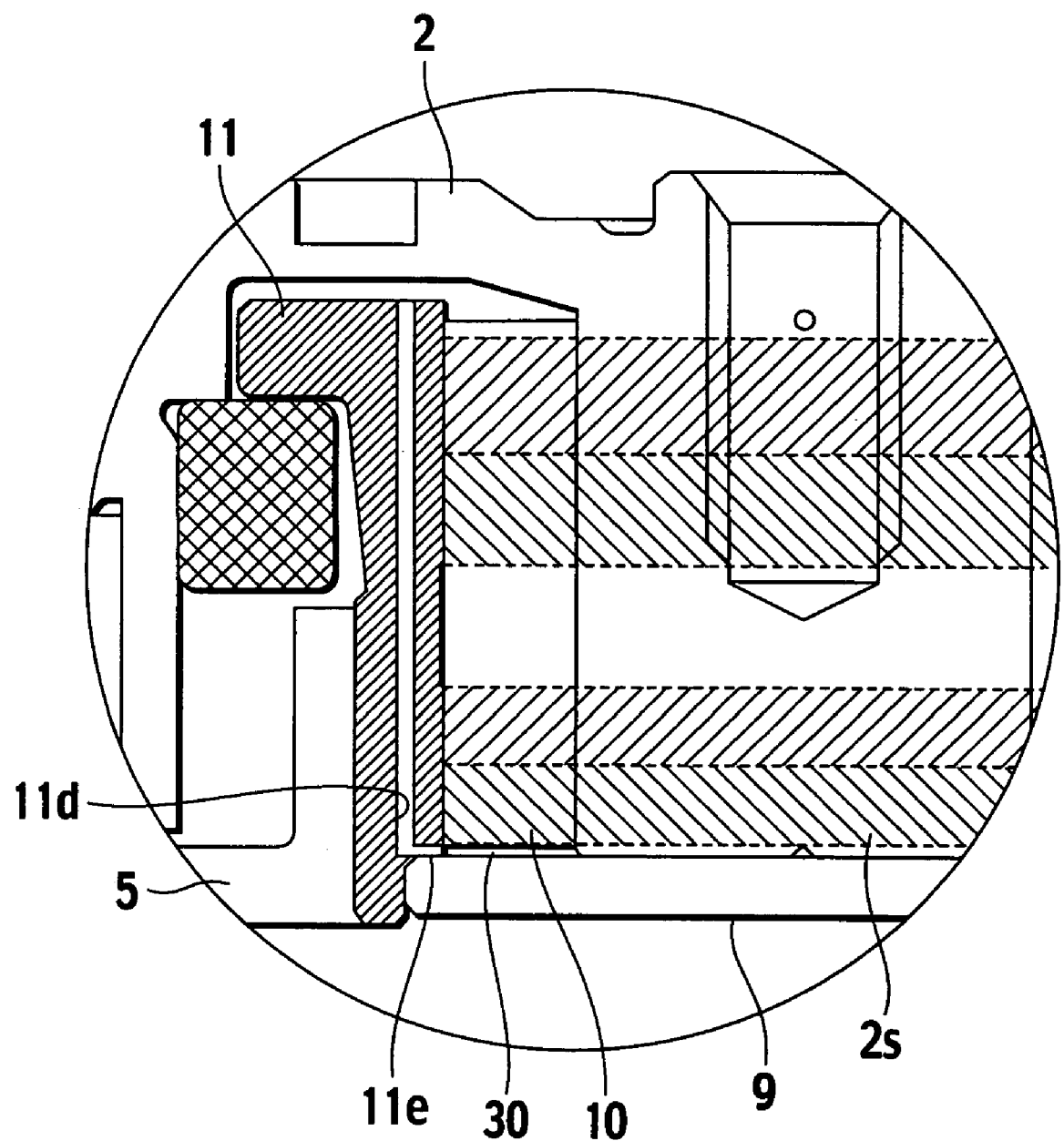
FIG. 7 is a partial cross-sectional view illustrating a first modification.

Although the balance hole 10a is made in the bearing 10 in this embodiment, a conduit 11d can be made in the sleeve 11 instead of the balance hole 10a as illustrated in FIG. 7. Specifically, the conduit 11d has an opening at the upper end of the sleeve 11 and extends to communicate with a cutout 11e at a bottom portion of the sleeve 11, the cutout 11e being open toward the gap between the counter plate 9 and the bearing 10. The conduit 11d has the same function as the balance hole 10a made in the bearing 10, as apparent to those skilled in the art.

Figure 8:
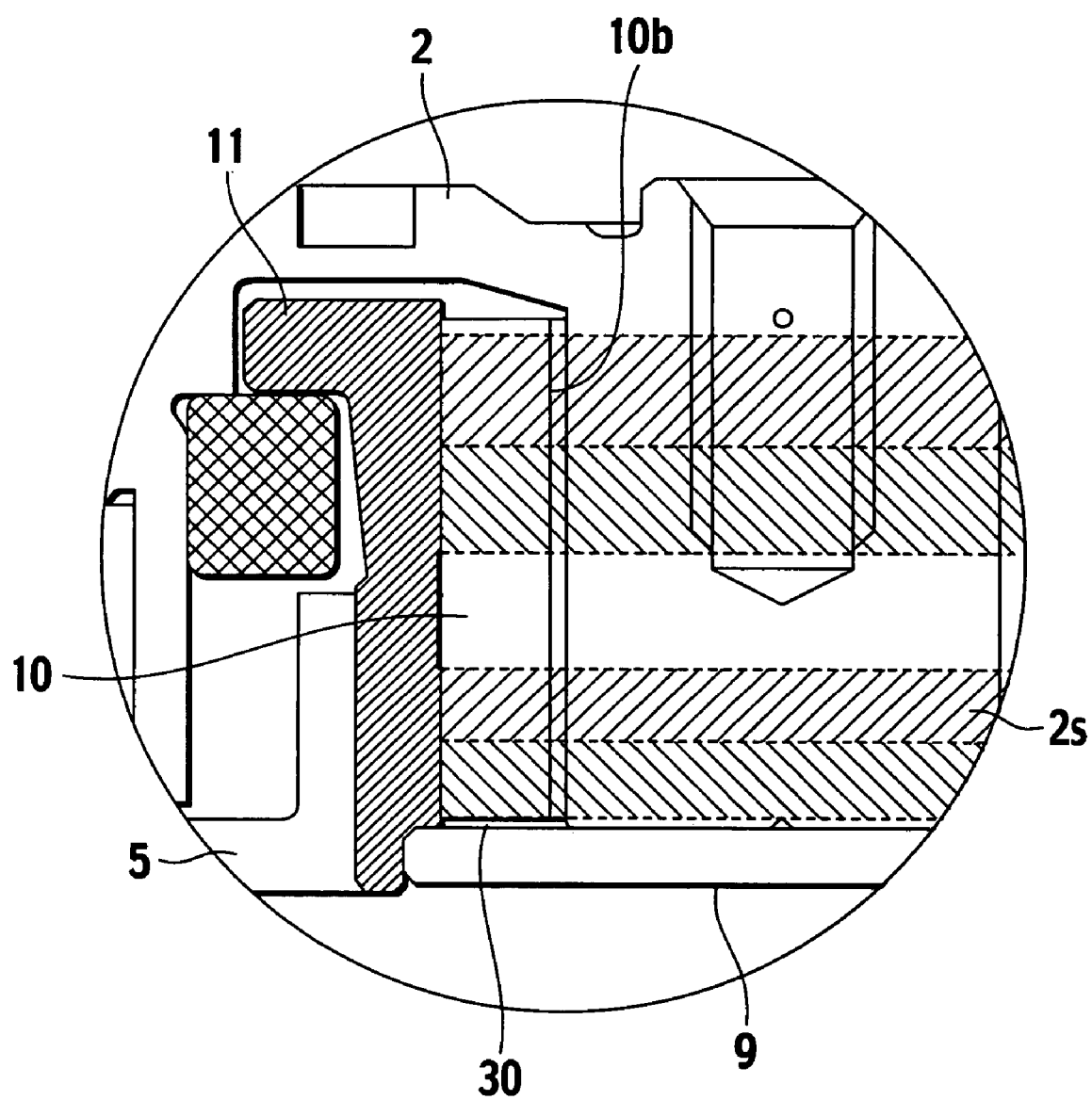
FIG. 8 is a partial cross-sectional view illustrating a second modification.

In addition, a recess portion 10b can be provided in and on the inner surface of the bearing 10 instead of the balance hole 10a and the conduit 11d, as illustrated in FIG. 8. The recess portion 10b can have a U-shaped or V-shaped cross-section and extend from the upper end of the bearing 10 through the lower end of the bearing 10, thereby exhibiting the same effect as the balance hole 10a and the conduit 11d. By the way, the recess portion 10b may be provided in and on the outer surface of the shaft portion 2s.

Furthermore, when the bearing 10 is made of a sintered metal (alloy), the dynamic pressure exerted on the lubrication oil 30 can be delivered through the pores in the sintered alloy to the bottom of the bearing 10, thereby exhibiting the same effect by the balance hole 10a without providing the balance hole 10a.

By the way, the motor in this embodiment is a three-phase motor provided with the core 6 that has six protruding poles and the cut-away portion L (see FIG. 5). The cut-away portion L has an area corresponding to where three of nine protruding poles that could have been made if the core 6 had a shape of a closed ring without any cut-away portion can be disposed. When the motor having this core 6 with the cut-away portion L is loaded on a disc drive apparatus, the cut-away portion L houses a pair of reading/writing heads 61a, 61b, each of which opposes the upper and the bottom surface of the magnetic recording disc 1, respectively (see FIG. 1), thereby enabling double-face recording and therefore doubling a recording capacity in unit time.

The present invention is not limited to the representative embodiments and modifications shown and described herein, but other various modifications or alterations may be made without departing from the spirit and scope of the general inventive concept as defined by the appended claims and their equivalents.

For example, the grooves provided in the thrust and the radial dynamic pressure bearing can be a Rayleigh step groove without limiting to the herringbone groove.

Although the pump-in dynamic pressure generation portion P is defined by the outer circumferential surface 11b2 of the flange portion 11b and the inner circumferential surface 2a of the hub 2 that opposes the outer circumferential surface 11b2 as stated above, the pump-in dynamic pressure generation portion P can be configured by the upper surface 11b3 of the flange portion 11b and the inner lower surface 2b of the hub 2 that opposes the upper surface 11b3.

However, the groove can be formed with higher machining accuracy in the side 30 surface than in the upper surface when a lathe turning method, which is better suited for processing an axial member, is used. Therefore, the pump-in dynamic pressure generation portion P is preferably disposed between the outer circumferential surface 11b2 of the flange portion 11b and the inner circumferential surface 2a of the hub 2 by forming the groove in the outer circumferential surface 11b2.

In the above, the shaft portion 2s is firmly fitted into the bearing 10 so as to have the bearing 10 as a part thereof, and then is inserted into the sleeve 11. However, the shaft portion 2s can be directly inserted into the sleeve 11 without using the bearing 10.

In this case, a through path can be made in the shaft portion 2s, thereby exhibiting the same effect as the balance hole 10a described above.

What is claimed is:

1. A motor comprising:
   a rotor including a hub portion, a shaft portion mounted at the center of the hub and a thrust ring attached on the inner circumferential surface of the hub portion;
   a stator including a sleeve with an insertion hole into which the shaft portion is inserted and a flange portion extending radially outward at a first end of the insertion hole; and
   a lubrication fluid filled portion filled with lubrication fluid to be used to rotatably support the rotor with respect to the stator
   wherein the lubrication fluid filled portion includes:
   a thrust dynamic pressure bearing portion;
   a radial dynamic pressure bearing portion; and
   a pump-in dynamic pressure generation portion disposed between the thrust dynamic pressure bearing portion and the radial dynamic pressure bearing portion located in a position where the inner circumferential surface of the hub is opposed to the outer circumferential surface of the flange portion so as to generate pressure that causes the lubrication fluid to move toward the radial dynamic pressure bearing portion.

2. A motor as recited in claim 1, wherein the shaft portion or the sleeve portion has a path allowing the lubrication fluid to move between both ends of the radial dynamic pressure bearing portion.

3. A motor as recited in claim 1, wherein the thrust dynamic pressure bearing portion is located in a position where an upper surface of the thrust ring is opposed to a lower surface of the flange portion, and the radial dynamic pressure bearing portion is located in a position where the inner circumferential surface of the sleeve is opposed to the outer circumferential surface of the shaft portion.

4. A motor as recited in claim 1, wherein the pump-in dynamic pressure generation portion generates pressure for floating the rotor at a position where an upper surface of the sleeve is opposed to of an inner lower surface of the hub portion and at a position where the shaft portion is opposed to a counter plate with which a second end of the insertion hole is sealed.

5. A motor as recited in claim 1, wherein a bearing is secured on the outer circumference of the shaft portion and the lubrication fluid filled portion includes the radial dynamic pressure bearing portion located in a position where the outer circumferential surface of the bearing is opposed to the inner circumferential surface of the sleeve.

* * * * *